United States Patent [19]

Garner et al.

[11] Patent Number: 5,262,207

[45] Date of Patent: Nov. 16, 1993

[54] METHOD OF ELECTROSTATICALLY COATING NONCONDUCTIVE PANELS

[75] Inventors: David P. Garner; Alaa A. Elmoursi, both of Sterling Heights, Mich.

[73] Assignee: General Motors Corporation, Detroit, Mich.

[21] Appl. No.: 753,494

[22] Filed: Sep. 3, 1991

[51] Int. Cl.$^5$ ............................................. B05D 1/04
[52] U.S. Cl. ................................. 427/471; 427/210; 427/421
[58] Field of Search ............... 427/27, 31, 33, 13, 427/210, 208, 322, 471, 475, 477, 421

[56] References Cited

U.S. PATENT DOCUMENTS

| 3,236,679 | 2/1966 | Spiller et al. | 427/27 |
| 3,741,793 | 6/1973 | Simmons | 117/93.4 NC |
| 4,585,699 | 4/1986 | Berteaud et al. | 427/210 |

FOREIGN PATENT DOCUMENTS

| 0365414 | 4/1990 | European Pat. Off. | |
| 2450260 | 5/1976 | Fed. Rep. of Germany | |
| 1320275 | 1/1963 | France | |
| 1509010 | 12/1967 | France | |
| 2062262 | 6/1971 | France | |
| 2170215 | 9/1973 | France | |
| 2429620 | 1/1980 | France | |
| 59-6705 | 2/1984 | Japan | 427/13 |
| 2131723 | 6/1984 | United Kingdom | 427/27 |

*Primary Examiner*—Shrive Beck
*Assistant Examiner*—Diana Dudash
*Attorney, Agent, or Firm*—Randy W. Tung

[57] ABSTRACT

Plastic automotive panels are painted electrostatically by coating the rear of the panel with conductive material to serve as the grounded terminus of an electrostatic paint deposition field and paint is sprayed onto the front of the panel by conventional electrostatic spray guns. The coating is applied to the panels by spraying a conductive salt or a conductive primer to the rear surface and allowed to dry, or the panel is formed with the conductive coating molded in situ. In the latter case, conductive material is sprayed onto a mold surface or a metal foil or metallized plastic sheet is inserted into the mode before the part is formed to result in a panel with a conductive rear surface. Also, in-mold coating can be used to apply a conductive coating during the formation of a plastic panel.

4 Claims, No Drawings

METHOD OF ELECTROSTATICALLY COATING NONCONDUCTIVE PANELS

FIELD OF THE INVENTION

This invention relates to electrostatic coating or painting and particularly to a method for such coating on nonconductive panels.

BACKGROUND OF THE INVENTION

Electrostatic spray painting of plastics is of interest commercially due to the increase in transfer efficiency when painting plastics using electrostatic deposition and the corresponding decrease in emissions since less sprayed paint is used to provide adequate coverage to the plastic part. The electrostatic painting process requires that an electrostatic field suitable for the deposition of charged paint particles be established at the article being painted. When the article itself is conductive, it is typically electrically grounded to serve as an electrode for the electrostatic field. When the article is not conductive, conductive coatings, either high molecular weight (a primer) or low molecular weight, are used on the surface to be painted to increase the conductivity of the surface sufficiently to serve as such an electrode.

In the case of a conductive primer, the primer may serve other purposes than solely to provide a conductive surface. Primers may yield a better surface for painting, prevent solvent penetration into the plastic surface being painted, and/or a variety of other functions. In many cases, conductivity is imparted to the primer at the expense of these other properties. Thus the formulation of primers is restricted by the need to provide conductivity.

The low molecular weight coatings are organic salts or mixtures of organic and ionic species having the characteristics of being able to be adsorbed on the surface of the plastic and having the ionic species positioned such that a conductive surface is generated. Problems with appearance (the coating shows through the color coat or in some way alters the color, uniformity, distinction of image or other appearance characteristic of the paint and adhesion (the coating interferes with the interaction between the surface of the plastic and the paint after cure) are possible. In the long term, poor adhesion can lead to a separation of the coating film from the plastic.

To avoid using such conductive coatings on the surface to be painted, it has previously been proposed to locate a grounded metal backing plate at the back of the plastic panel to provide a terminus for an electrostatic paint deposition field. While this may be useful where the appearance and uniformity of the paint is not critical, such backing plates do not provide either intimate contact with the panel or adequate conformation to the article for a suitable field electrode (resulting in nonuniform paint distribution), and create the expense of a large inventory of specially shaped plates for each panel shape and the need to attach and remove a plate to the panels.

It has further been proposed, as set forth in U.S. Pat. No. 3,741,793 to Simmons, to coat the rear of the part with water or other conductive liquid which is grounded to serve as an electrode for electrostatic deposition on the front of the part. In particular, Simmons introduces a vapor to the inside of a hollow article which is cool enough to cause condensation of the vapor onto the inner wall. There is no indication how this process might be extended to an open structure such as a panel or whether it produces a coating of sufficient conductivity and continuity to result in a high quality coating meeting rigorous appearance specifications. In any event, it is expected that the use of such a liquid electrode on an article, however applied, is limited to special paint jobs such as painting bottles. In an environment such as painting automotive parts it is the practice to mount the parts onto carriers, wash the parts and then paint them; a liquid conductive coating on the part would be washed off before the painting step. Additionally, the parts may experience high temperatures and time delays after a conductive liquid coating is applied and before painting, thereby allowing the liquid coating to dissipate before it serves its function.

SUMMARY OF THE INVENTION

It is therefore an object of the invention to provide in an electrostatic painting method a rear surface coating which is a solid conductive film sufficiently durable to withstand paint facility operations.

The invention is carried out by the method of electrostatically coating the front surface of a nonconductive panel by coating apparatus comprising the steps of: forming a continuous solid conductive film on the rear of the panel, the film having a resistivity less than 10 ohms per square; establishing an electrostatic field between the solid conductive film and coating apparatus; and electrostatically depositing coating material on the front surface.

DESCRIPTION OF THE INVENTION

In automotive manufacture plastic panels for body parts are formed of various compounds such as reaction injection molding material (RIM), thermoplastic olefin (TPO), thermoplastic urethane (TPU) and sheet molding compound (SMC). The molded panels have different surface characteristic and thus do not all respond to a treatment in exactly the same way. The ensuing description includes several embodiments of the invention for use with plastic panels; some of the embodiments may be more suitable for some panel materials than for others.

The methods of providing a conductive solid coating on the rear of the panel have already been used for applying a film or coating to the front of the panel either for providing conductivity for electrostatic coating or for other purposes. Thus the coating or molding technology is well known and is not described in detail herein.

The practice of applying a conductive coating of the front of a panel for electrostatic painting was to serve a two-fold purpose: to provide a grounded surface for establishing an electrostatic field between the panel and the coating apparatus, and to dissipate the charge associated with the paint droplets deposited on the surface. It is a premise of this invention that the function of providing a ground plane for an electrostatic field is best carried out by a conductive surface on the rear of the panel and the dissipation of surface charge is adequately performed by the wet paint applied to the front surface. The solvents in the paint are sufficiently conductive for this purpose, although the paint is not usually conductive after it is cured.

One method of applying a conductive coating to the rear surface of a plastic panel is by spraying a salt solution on the rear surface and letting it dry. Solutions of this type are known for application to the front surface of parts to be painted. In particular, test panels of TPU, SMC, TPO and RIM were sprayed with a conductive quaternary ammonium salt, Cyastat SN, supplied by American Cyanamid, at a solution concentration of 1.9 mole %/liter. The solution was 20/80 water/isopropanol for TPO and 100% water for the others. The salt solution was applied on the side opposite the side to be painted. Upon complete coverage, the panels were set aside to dry.

The paint transfer efficiency of the treated panels was measured by painting pairs of panels comprising a treated panel and a metal panel of the same size. The painting was done by a commercial rotating bell electrostatic spray gun using a commercial automotive paint. The weight gain of each panel was measured and the gain of each test panel was compared to its associated metal panel to determine transfer efficiency. The transfer efficiencies were SMC, 63%; TPO, 103%; TPU, 90% and RIM, 72%. The same test run with untreated panels resulted in transfer efficiencies ranging from 14% to 64%, thus indicating that the treatment of the rear surface imparts significantly improved paint deposition. The variation between the treated panels is explained by the surface characteristics of the panels. The panels with lower transfer efficiencies have greater surface porosity and the salt solution, when it dried to a solid film, did not result in a continuous film, thereby causing a higher resistivity. The smoother surfaces, such as TPO panels, had the lowest resistivity due to a continuous film and the best paint transfer efficiency. Our tests show that a resistivity of $10^9$ ohms per square or less is required for suitable paint deposition.

The sprayed-on salt coatings, just described, can be washed off, which is an advantage where is desired to remove the conductive coating, or is a disadvantage where the coating is vulnerable to being washed off prior to painting due to washing of the panel. Other types of coatings or films can be used where a permanent conductive layer is preferred.

One permanent coating is a conductive primer which is sprayed onto the back of the panel. Since the usual qualities of a primer such as promoting adhesion, etc. are of no concern when it is applied to the back of the panel, there is great freedom in formulating the primer for optimum conductive properties. For example, it may have a high content of carbon black. The primer is sprayed onto the panel and allowed to dry. Then the panel is ready to be mounted to a grounded conveyor hanger and the front side is painted electrostatically.

Rather than applying a conductive coating to a panel after it has been molded, such a coating can be formed as part of the panel in the mold. A conductive primer or other conductive coating can be sprayed onto the surface of the mold which forms the rear of the panel so that as the panel is formed in the mold the conductive layer on the mold surface becomes the rear surface of the panel. Instead of spraying a liquid onto the mold, a sheet of conductive material such as aluminum foil or a metallized plastic film is inserted into the mold and is molded to the surface of the panel. These examples of in-situ molding are well known in the molding art to provide surface layers for other purposes.

Still another expedient for forming a conductive rear surface on the panel is in-mold coating. There, the panel is formed in the mold and partially cured, the mold pressure is released, conductive coating material is injected into the mold to coat the rear surface, and the cure cycle is completed to incorporate the conductive material as a part of the panel.

Regardless of the process of applying a conductive layer to the rear of the molded panel, the conductive coating remains during cleaning steps or other preparation of the panel for painting. Then the conductive layer is grounded and the front of the panel is sprayed electrostatically by apparatus which generates a high voltage on the paint apparatus to establish an electrostatic field between the apparatus and the grounded rear surface of the plastic panel, the field strength being sufficient to help deposit charged paint particles onto the front of the panel. Typically, some wrap-around of the paint occurs to form a continuous paint coating from the front of the panel to the edge of the conductive layer on the rear. This provides a conductive path in the fresh paint for charge deposited on the front of the panel to flow to the grounded layer on the rear of the panel.

The paint appearance of the finished product is the primary concern where the application is for automotive body panels, appliances and other high quality articles. The method of this invention using the grounded back surface provides excellent quality as measured by paint thickness uniformity, distinctness of image and other standard tests for paint quality as well as by subjective observations.

The embodiments of the invention in which an exclusive property or privilege is claimed are defined as follows:

1. The method of electrostatically coating the front surface of a nonconductive panel by coating apparatus comprising the steps of:
    forming a continuous solid conductive film on the rear surface only of the panel, the film having a resistivity less than $10^9$ ohms per square;
    establishing an electrostatic field between the solid conductive film and coating apparatus; and
    electrostatically depositing coating material on the front surface.

2. The method as defined in claim 1 wherein the step of forming the solid conductive film on the rear of the panel comprises:
    spraying a solution containing conductive material onto the rear surface of the panel and
    drying the solution to form the solid conductive film on the rear surface.

3. The method as defined in claim 2 wherein the solution containing conductive material comprises an aqueous solution of quaternary ammonium salt.

4. The method as defined in claim 1 wherein the step of forming the solid conductive film on the rear of the panel comprises:
    spraying a conductive paint onto the rear surface of the panel and
    drying the conductive paint to form the solid conductive film on the rear surface.

* * * * *